United States Patent [19]

Åsberg

[11] 4,273,391
[45] Jun. 16, 1981

[54] DEVICE FOR AXIAL ADJUSTMENT OF A ROTATABLE BODY

[75] Inventor: Sture L. Åsberg, Partille, Sweden

[73] Assignee: SKF Nova AB, Gothenburg, Sweden

[21] Appl. No.: 65,621

[22] Filed: Aug. 10, 1979

Related U.S. Application Data

[63] Continuation of Ser. No. 855,758, Nov. 29, 1977, abandoned.

[30] Foreign Application Priority Data

Dec. 1, 1976 [SE] Sweden .............................. 7613437

[51] Int. Cl.³ ............................................. F16C 25/06
[52] U.S. Cl. ............................. 308/174; 308/189 A; 308/207 A
[58] Field of Search ................. 74/396, 424; 308/174, 308/175, 178, 189 R, 189 A, 197, 207 R, 207 A, 227, 229, 232, 236

[56] References Cited

U.S. PATENT DOCUMENTS

| | | | |
|---|---|---|---|
| 1,708,710 | 4/1933 | Vincent | 74/424 |
| 2,040,793 | 5/1936 | Peterman | 308/207 R |

FOREIGN PATENT DOCUMENTS 1575734  2/1970  Fed. Rep. of Germany .......... 308/174

*Primary Examiner*—Frederick R. Schmidt
*Attorney, Agent, or Firm*—Eugene E. Renz, Jr.

[57] ABSTRACT

A bearing assembly rotatably supporting a shaft journal having a gear wheel at one end in a cylindrical seat in a housing comprising a one-piece outer ring having threads on its outer periphery cooperating with threads in the cylindrical seat. A plurality of circumferentially spaced openings are provided in the outer axial end face of the outer ring to accommodate a turning tool having projections corresponding to the openings to permit axial adjusting movement of the bearing assembly relative to the housing. The bearing assembly further includes an inner race ring on the shaft journal, two rows of rolling elements in the annular space between the rings spaced closely relative to one another. One of the rows comprises rollers having axes inclined at an angle to the bearing axis disposed adjacent the gear wheel and the other row comprises balls which roll against raceways in the rings to provide angular contact which are disposed at the opposite end of the shaft journal.

1 Claim, 1 Drawing Figure

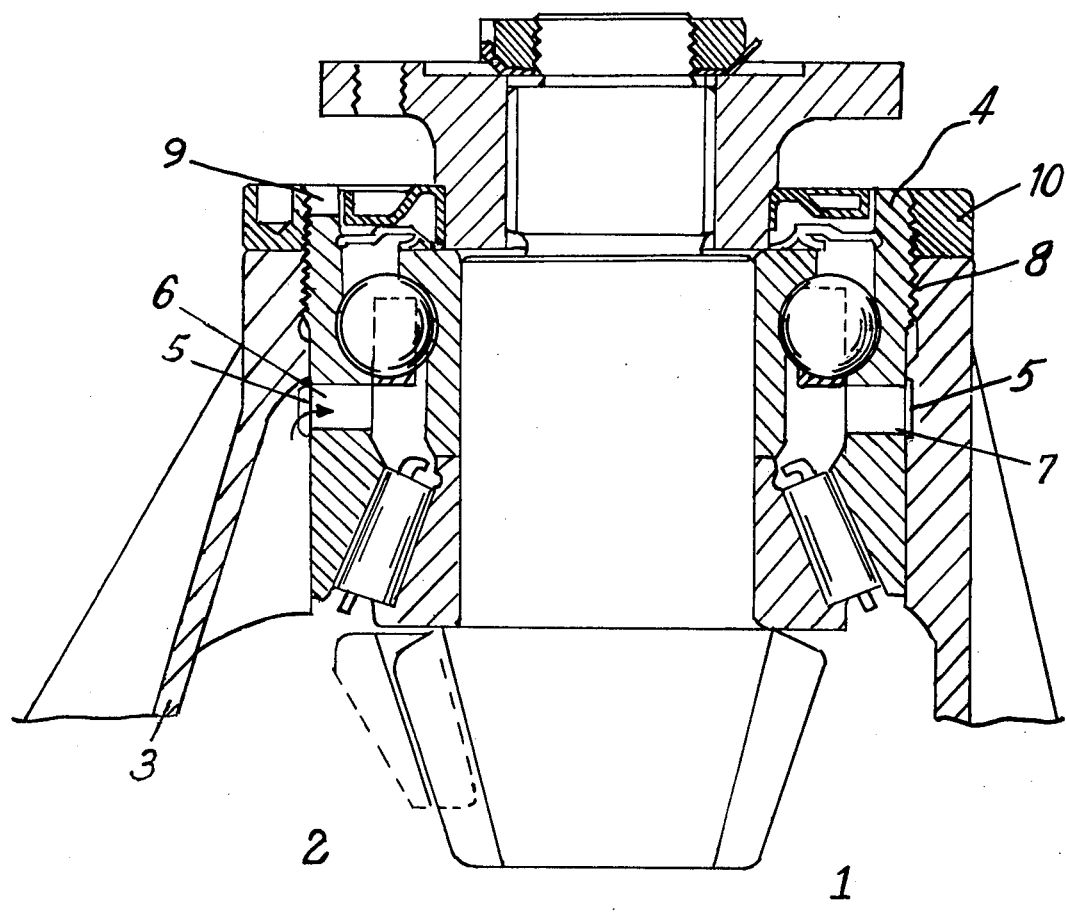

DEVICE FOR AXIAL ADJUSTMENT OF A ROTATABLE BODY

This is a continuation of application Ser. No. 855,758, filed Nov. 29, 1977, now abandoned.

BACKGROUND OF THE INVENTION

The present invention refers to a device for axial adjustment of a rotatable body which is mounted in a bearing.

More specifically, the present invention provides a bearing assembly rotatably supporting a shaft journal having a gear wheel at one end in a housing in a manner so that it may be easily adjusted to mesh with the pinion of gearing.

The invention is intended to be used primarily for supporting bodies, the axial position of which it is desirable to be able to adjust very accurately. As an example can be mentioned the supporting of a pinion gear wheel, the position of which must be adjustable in order to bring about an accurate gear contact between the pinion and the crown wheel of a gearing.

It is earlier known to use spacer washers between the end surfaces of a pinion bearing ring and a radial shoulder at a bearing seat in order to bring about axial adjustment of a pinion gear wheel. The adjustment procedure when using this method is however troublesome and timewasting and it requires qualified work. It is further known to mount the pinion bearing in surrounding sleeves, which have an external cylindrical portion and a portion provided with screw threads, the sleeves thereby being arranged axially displaceable in a cylindrical seat in the gear housing, the screw threads engaging in corresponding screw threads provided in the gear housing. The sleeves will be displaced axially when turned, whereby also the bearing and the pinion gear wheel will be displaced in relation to the gear housing, which means that the adjustment of the pinion can be brought about by turning of the sleeves.

The difficulties with such a device are the inevitable form defects which will occur at the manufacture of the sleeves, e.g. tolerances, excentricity, out-of-roundness and angular defects and dimension changes at operation in the form of contact deformations, flexing and thermal expansion. These factors will influence the gear contact. This device will furthermore require large space and it is heavy and requires considerable costs. The negative factors have together resulted in that the device has been used only very little in practice.

It is also known to provide the envelope surface of a bearing ring with threads along its whole extension and to provide a bearing seat with corresponding threads, thereby making it possible to adjust the axial position of the bearing in the seat by turning the threaded bearing ring. The threading, however, makes it difficult to maintain an accurate angular and centric position of the bearing, since it is difficult to machine the thread exactly concentrically and coaxially with the seat and the raceways, respectively, and to give the threads proper tolerances.

The purpose of the present invention is to provide a bearing arrangement with a bearing, which in operation when arranged on a rotatable body will make possible an accurate adjustment of the body which is maintained during operation.

This is according to the invention achieved thereby that the bearing arrangement has been given the characteristics defined in the attached claims.

BRIEF DESCRIPTION OF THE DRAWINGS

The invention will herebelow be further described with reference to the attached drawing, which shows a longitudinal section through an embodiment of the invention.

DESCRIPTION OF THE PREFERRED EMBODIMENTS

The FIGURE shows a pinion gear wheel 1, which cooperates with a crown wheel 2. The gear wheels 1 and 2 are supported in a gear housing 3. The bearing of the crown wheel is of a common type and is therefore not shown. The pinion gear wheel is supported in a double-row rolling bearing, according to the shown embodiment having a common outer race ring 4, which is axially displaceable in a cylindrical seat in the housing 3. The mating cylindrical surfaces of the seat and the race ring can be machined and positioned very accurately. Thus the angular and centered position of the bearing in the seat is not changed when the bearing ring is rotated for adjusting its axial position, and the bearing can be heavily loaded without appreciably changing its position in its seat when it is fixed.

For lubrication of the outer row of rolling bodies of the bearing lubrication groove 5 is arranged around the seat, which groove communicates with radial bores 6, 7 through the outer race ring of the bearing. The bearing seat terminates at its outer portion into a screw threaded bore 8, the screw threads of which cooperate with corresponding screw threads in a screw threaded portion of the envelope surface of the ring 4. When the ring 4 is turned the bearing and also the gear wheel 1 consequently are displaced axially, whereby an adjustment of the position of the gear wheel 1 in relation to the gear wheel 2 can be obtained. In order to make possible a simple turning of the ring 4 a number of apertures 9 are provided in the outer end surface of the ring, which apertures are intended to cooperate with a turning member having corresponding projections.

When the turning of the ring 4 has effected the gear wheel 1 to receive its desired position the position of the ring is locked in the housing 3 by tightening a locking nut 10, which is arranged on the screw thread of the bearing and engages an end surface of the housing 3.

The invention is not limited to the embodiment described hereabove. It is also applicable in other assemblies than pinion supports and in connection with other types of bearings than the one shown in the drawing. It is also possible to arrange a screw thread adjacent the seat for the inner race ring of the bearing which then is preferably made in one piece, and to provide the inner race ring with an internal screw thread in such a manner that the inner race ring seat position for the bearing can be adjusted. It is also possible to let the rotatable body be mounted on the outer race ring of the bearing, whereby the inner race ring for instance is mounted on a non-rotatable shaft. The embodiment shown on the drawing with a rolling bearing including one portion in the form of an angular contact ball bearing and a second portion in the form of a taper roller bearing is however suitable for supporting a pinion, whereby the roller bearing part is located nearest to the gear wheel where the highest load will occur and where it is most easy to bring about a satisfactory lubrication.

The bearing portion remote from the gear wheel can be a ball bearing which through its large contact angle will give the bearing a shorter axial extension as this bearing portion is less heavily loaded and as a ball bearing has lower lubrication requirements.

I claim:

1. The combination comprising a housing, a shaft journal having a gear wheel at one end, a bearing assembly rotatably supporting the shaft journal in a cylindrical seat in said housing including a one-piece outer ring having threads on its outer periphery cooperating with threads in said cylindrical seat, means defining a plurality of circumferentially spaced openings in the outer axial end face of the outer ring to accommodate a turning tool having projections corresponding to the openings thereby to permit axial adjusting movement of said bearing assembly relative to said housing, an inner race ring on said shaft journal, two rows of rolling bodies in the annular space between said rings spaced closely relative to one another, one of said rows comprising rollers having axes inclined at an angle to the bearing axis disposed adjacent said gear wheel, the other row of rolling bodies comprising balls which roll against raceways in the rings to provide angular contact disposed at the opposite end of said shaft journal.

* * * * *